United States Patent
Heyn et al.

(10) Patent No.: US 8,415,613 B2
(45) Date of Patent: Apr. 9, 2013

(54) METHOD AND APPARATUS FOR CHARACTERIZING A SAMPLE WITH TWO OR MORE OPTICAL TRAPS

(75) Inventors: Sven-Peter Heyn, Berlin (DE); Jacob Kerssemakers, Amsterdam (NL); Detlef Knebel, Berlin (DE); Helge Eggert, Berlin (DE); Torsten Jaehnke, Berlin (DE); Joern Kamps, Berlin (DE)

(73) Assignee: JPK Instruments AG, Berlin (DE)

( * ) Notice: Subject to any disclaimer, the term of this patent is extended or adjusted under 35 U.S.C. 154(b) by 0 days.

(21) Appl. No.: 12/602,151

(22) PCT Filed: May 30, 2008

(86) PCT No.: PCT/DE2008/000897
§ 371 (c)(1),
(2), (4) Date: May 21, 2010

(87) PCT Pub. No.: WO2008/145110
PCT Pub. Date: Dec. 4, 2008

(65) Prior Publication Data
US 2010/0251437 A1  Sep. 30, 2010

(30) Foreign Application Priority Data

| May 31, 2007 | (DE) | 10 2007 025 532 |
| May 31, 2007 | (DE) | 10 2007 025 533 |
| May 31, 2007 | (DE) | 10 2007 025 534 |
| May 31, 2007 | (DE) | 10 2007 025 535 |
| Dec. 21, 2007 | (DE) | 10 2007 063 065 |
| Dec. 21, 2007 | (DE) | 10 2007 063 066 |

(51) Int. Cl.
*H01S 1/00* (2006.01)
*H01S 3/00* (2006.01)
*H05H 3/02* (2006.01)

(52) U.S. Cl.
USPC ........... 250/251; 250/307; 250/308; 250/310; 850/1; 850/2; 850/5; 850/8; 850/10; 850/33; 356/601; 356/625

(58) Field of Classification Search .................. 250/251, 250/307, 308, 310; 850/1, 2, 5, 8, 10, 33; 356/601, 625
See application file for complete search history.

(56) References Cited

U.S. PATENT DOCUMENTS

| 5,445,011 A * | 8/1995 | Ghislain et al. ................. 73/105 |
| 6,833,923 B2 | 12/2004 | Florin |
| 7,525,088 B2 * | 4/2009 | Botchway et al. ............ 250/306 |

OTHER PUBLICATIONS

Faellman, Erik et al., Design for Fully Steerable Dual-Trap Optical Tweezers, Applied Optics, vol. 36, No. 10 (Apr. 1, 1997.

(Continued)

*Primary Examiner* — Nikita Wells
*Assistant Examiner* — Meenakshi Sahu
(74) *Attorney, Agent, or Firm* — Sutherland Asbill & Brennan LLP (57) ABSTRACT

The present invention relates to a method for investigating a sample using scanning probe photon microscopy or optical force microscopy, and to an apparatus which is designed accordingly. The method or the apparatus provides for two optical traps which can be moved in a local region of the sample, wherein in at least one of the two traps a probe is held. The sample is scanned using the two traps and the measured data from the two traps are captured separately and evaluated by correlation. In particular interference signals resulting from an interaction between sample and light trap can be eliminated by the method.

16 Claims, 6 Drawing Sheets

OTHER PUBLICATIONS

Jaekl, Petr et al., Measurement of Surface Details with Nanometer Resolution Using Several Optically Held Probes, Proc of SPIE vol. 6180 (2006).

Reicherter, Marcus et al., Fast Digital Hologram Generation and Adaptive Force Measurement in Liquid-Crystal-Display-Based Holographic Tweezers, Applied Optics, vol. 45, No. 5 (Feb. 10, 2006).

Jeney, Sylvia et al., Use of Photonic Force Microscopy to Study Single-Motor-Molecule Mechanics, Methods in Molecular Biology, vol. 164 (2001).

Rohrbach, Alexander et al., Trapping and Tracking a Local Probe with a Photonic Force Microscope, Review of Scientific Instruments, vol. 75, No. 6 (Jun. 2004).

Malmqvist, L., et al., Second-Harmonic Generation in Optically Trapped Nonlinear Particles with Pulsed Lasers, Applied Optics, vol. 34, No. 18, Jun. 20, 1995.

Hertz, H.M., et al., Optically Trapped Non-Linear Particles as Probes for Scanning Near-Field Optical Microscopy, Ultramicroscopy, vol. 57, 1995.

Kress, Holger, et al., Tilt Angle Dependent Three-Dimensional-Position Detection of a Trapped Cylindrical Particle in a Focused Laser Beam, Applied Physics Letters, vol. 84, No. 21, May 24, 2004.

International Search Report PCTDE2008000895, Sep. 25, 2008.

Dreyer, Jacob Kisbye, et al., Improved Axial Position Detection in Optical Tweezers Measurements, Applied Optics, vol. 43, No. 10, Apr. 1, 2004.

Pralle, A., et al., Three-Dimensional High-Resolution Particle Tracking for Optical Tweezers by Forward Scattered Light, Microscopy Research and Technique, vol. 44, 1999.

Tischer, Christian, et al., Determination and Correction of Position Detection Nonlinearity in Single Particle Tracking and Three-Dimensional Scanning Probe Microscopy, Microscopy and Microanalysis, vol. 10, 2004.

International Search Report PCT/DE2008/000894, dated Sep. 29, 2008.

International Search Report PCT/DE2008/000897, dated Sep. 23, 2008.

\* cited by examiner

METHOD AND APPARATUS FOR CHARACTERIZING A SAMPLE WITH TWO OR MORE OPTICAL TRAPS

CROSS-REFERENCE TO RELATED APPLICATION

This is a submission pursuant to 35 U.S.C. 154(d)(4) to enter the national stage under 35 U.S.C. 371 for PCT/DE2008/000897 filed May 30, 2008. Priority is claimed under 35 U.S.C. 119(a) and 35 U.S.C. 365(b) to German Patent Application Numbers 10 2007 025534.0 tiled May 31, 2007, 10 2007 025533.2 filed May 31, 2007, 10 2007 025535.9 filed May 31, 2007, 10 2007 025532.4 filed May 31, 2007, 10 2007 063065.6 filed Dec. 21, 2007 and 10 2007 063066.4 filed Dec. 21, 2007. The subject matters of PCT/DE2008/000897 and German Patent Application Numbers 10 2007 025534.0, 10 2007 025533.2, 10 2007 025535.9, 10 2007 025532.4, 10 2007 063065.6 and 10 2007 063066.4 are hereby expressly incorporated herein by reference in their entirety.

The invention relates to a method and an apparatus for measuring the properties of a sample by means of a scanning probe method, in particular by means of a "Photonic three microscope" (PFM).

BACKGROUND OF THE INVENTION

PFM is a scanning probe method, wherein the probe is represented by a particle or a plurality of particles captured in an optical trap. In this case, the optical trap fulfils the role of the cantilever as it is known from the area of scanning force microscopy. Here, the position of the optical trap may be modified by movable or modifiable optical elements in the optical path (acousto-optical deflectors (AOD), galvanically suspended mirrors, spatial light modulators (SLM), piezo-electrically suspended mirrors). Moreover, the position of a captured particle or of a plurality of captured particles may be determined by means of a detection system. In this respect, in principle two methods are distinguished. In the area of Back Focal Plane Interferometry, the interference of the light scattered by the particle with the light transmitted is utilised, in order to obtain the exact three-dimensional position of the particle within the focal volume of the optical trap. The measurement signals are here the intensity of the light transmitted as well as the differential signals of a quadrant photo diode (QPD). Apart from that, there is the method or video microscopy, wherein the detection of the movement of the particles is achieved by means of computer-based image recognition on a video which was recorded for example by means of a CCD camera.

From the U.S. Pat. No. 6,833,923, a photonic force microscope is known wherein the detection system is based on the interferometric measuring method described.

What the detection systems illustrated have in common is that the detection is based on interactions of the light forming the optical trap with the particle within the optical trap. Any interaction of this light with the sample would be undesired, can, however, not be avoided. Thus, any local changes in the index of refraction and/or the absorption coefficient of the sample will lead to changes in the measurement signal used for the localization. This may cause errors in the determination of the position and/or the movement of the particles to occur. The interferences may also be subject to time variations, for example if they are living cells or if the sample is modified by an interaction with the probe.

It is the object of the invention to provide a method and an apparatus for enhancing the possibilities of the scanning probe method for characterising a sample. In particular, any interferences of the sample or their effect on the measurement result, as may be caused by the interaction between the measurement setup and the sample, are supposed to be reduced.

SUMMARY OF THE INVENTION

The object of the invention is achieved by means of a method as claimed in the independent Claim 1 as well as by means of an apparatus as claimed in the independent Claim 16. Advantageous further developments and embodiments are the subject matters of the dependent claims.

The method according to the invention for examining a sample using scanning probe microscopy, in particular by means of scanning probe photon microscopy, comprises the following steps:
- generating two optical traps by means of focussed light having two focussing volumes which may be moved within a local area of the sample, wherein a probe is disposed in at least one of the two focussing volumes,
- scanning of the sample by means of the two optical traps by moving their focussing volumes relative to the sample,
- obtaining measurement data which are associated with the first optical trap containing the probe, during the scanning operation,
- obtaining measurement data which are associated with the second optical trap containing the probe, during the scanning operation,
- evaluating the measurement data by correlating the measurement data associated with the first or the second optical trap, respectively.

As discussed in connection with the prior art, there will inevitably be interferences in the measurement data as a result of the interaction between the light forming the optical trap and the sample. Now the invention is based on the observation that the characterisation of the sample may be improved by using two or even more optical traps by correlating the measurement data which are respectively associated with one of the optical traps with each other.

According to a preferred embodiment, the correlation is carried out on the measurement data from the first optical trap, which were respectively obtained at a first point in time of the scan, with the measurement data of the second optical trap, which were respectively obtained at a second point in time, at which the focussing volume of the second optical traps were located at or immediately adjacent to the location of the focussing volume of the first optical trap at the first point in time. According to this method, each location of the sample is measured at least twice, namely by the first and by the second optical traps, and the measurements are carried out at a relatively short time interval, for example within less than 20 ms. By means of correlating the data any computationally systematic measuring errors caused by the interaction of the optical trap with the sample may be corrected. For example, the systematic errors may be determined and may be eliminated by means of correlating the measurement data, because the sample will respond differently to an optical trap which is occupied by a probe than to a trap which is not occupied by a probe. Further, the two optical traps may act on the sample in different ways depending on the various properties of the light used (e.g. wavelength, polarisation or direction of propagation). The interaction measured between the probe and the sample, such as for example the von der Waals force between the probe and the sample, is the same for both traps which are each occupied by a probe, particularly by the same probe. It is of particular advantage here that each of the measurements is carried out by the two optical traps at the same location within a short period of time, because as a consequence any errors in the localization as they [sic . . . ] by a movement (e.g. a Brownian movement or a movement of a living sample) may be essentially eliminated.

According to one embodiment, one of the two optical traps is occupied by a probe, whilst the other optical trap does not contain a probe. This corresponds to a blank measurement with the second optical trap, in order to eliminate the effect of the interaction between the sample and the trap on the measurement data as described above. In this method, the correlation of the measurement data comprises in particular the formation of a difference between the measurement data. To this end, all of the interferences caused by the samples, which may lead to a distorted determination of the position of the probe, are eliminated.

According to an alternative embodiment it is also possible that both optical traps contain a probe, either the same or different probes. If different probes are used, there will also be a different interaction between the sample and the probe, so that also any systematic measurement errors caused by the differential measurement may be eliminated with both traps.

According to one embodiment, the focussing volumes of the two optical traps have identical dimensions. This embodiment is particularly preferred, if a trap carries out a blank measurement, since this ensures that the interferences caused to the sample by the trap will be the same for both measurements.

According to one embodiment, the two or more optical traps are formed by two or more independent beams generating optical traps at the same time or by generating traps at several positions as a result of a rapid change of position of a trap. In this case, the change of position of the one trap must be fast enough, in order that particles or a probe, which move(s) as a result of external influences, such as for example the Brownian movement, are still to be found in the focussing volume [sic]. An optical trap, in terms of this specification, therefore has to be generated by means of a temporally continuous light beam. The repeat rate only needs to be high enough to be able to capture a probe in the trap for a period of time which is very large compared to the repeat rate, for example 10 minutes.

According to one embodiment of the invention, the relative position of the traps with respect to one another may be adjusted in the three spatial dimensions. An example for realising several traps which may be adjusted in three spatial dimensions is for example shown in E. Fällman et al., "Applied Optics", Vol. 36, no. 10 (1997). These and other apparatus may be provided for generating the two movable traps according to the invention. In another embodiment of the invention, the relative position may be adjustable in just one lateral direction. The movements of the traps by the sample are coupled with each other here in several ways.

In one possible embodiment of the invention it may be provided that a probe carries out a measurement, such as for example the plotting of a topography, and a second probe carries out a different measurement, such as for example a chemical mapping. According to one embodiment of the invention, this may be realised by means of different probes. In this way, it is possible to separate the topography from the chemical measurement. For example, if there are bonding sites on a cell, these would not be detectable without the knowledge of the topography in particular including any interference. By using two or more traps it is ensured here that the time difference between the two measurements is minimal and thus any dynamic modifications in the sample will have no effect on the measurement.

A further embodiment of the invention provides for the use of one filled trap and of one or more empty traps. If a probe is present in one of the traps, whilst the others are empty, any interference caused by the sample may be computationally eliminated from the signal as soon as the filled trap and one of the empty traps have passed the same location. The time difference between the passes of the two traps may be substantially less by virtue of the use of two or more independent traps than this would be the case if just one trap was used.

According to one embodiment, the two traps are moved one after the other along a common trajectory, in particular at a constant distance, e.g. no less than the simple wavelength in the medium and no more than 50 μm.

In this context, the coupled movements of the traps may provide that two traps move along the predefined trajectory, whilst either the trap which is at the front in the direction of movement or the trap which is at the back in the direction of movement may contain a probe. In the case of such movements, also both probes may contain traps which distinguish themselves for example with respect to their chemical properties.

If a movement of the probe in a trap, which is caused by an external force acting on the probe, is detected, the position of the trap will follow the movement of the probe as a response to feedback. If such a movement of the trap filled with a probe occurs, the coupled movements of the traps may provide for one or more traps to follow this movement. If the direction of the movement of the filled trap can be approximately predicted, for example by means of an algorithm, it is possible that one or more traps anticipate this movement.

The coupled movements of the two traps may also provide for the movements of one or more empty traps to form one or more spherical shells around the trap filled with a probe. In this case, the spherical shells may by completely or only partially closed.

The position of at least one empty trap may be controlled via a rapidly movable optical element such as for example an acousto-optical deflector or a galvanically suspended mirror. This empty trap may then scan a plurality of positions around the filled trap during a standstill or a comparatively minor movement of the filled trap. As a result, there will be a higher probability in the case of a movement of the probe, which is controlled by external influences, that the path of the probe has already been scanned by an empty trap.

One object of the invention is an apparatus which is able to detect the signals from at least two traps independently from each other. By this means, the method according to the invention is to be realised in an optimum manner. To this end, various physical principles for separating the signals either individually or in combination may be applied. In the case of a filled trap, their signal consists of the combination of all of the interferences present in the beam path with the position of the probe. In the case of an empty trap, the signal of the trap only contains any interferences.

One preferred embodiment of the invention provides for the signals of two traps having polarisations with are oriented vertically relative to one another to be separated from each other by means of a corresponding optical element such as for example a polarising beam splitter cube. The signals of the two traps may then be detected at different locations.

A further embodiment of the invention provides for the use of light of different wavelengths for the traps. The number of traps is determined here by the number of the different wavelengths used. The signals of the optical traps or different wavelengths may be detected by means of optical elements such as for example dichroic beam splitters, separate from each other and at different locations.

One embodiment of the invention may also provide for the separation of the signals from two traps, the light of which propagates in different directions of propagation, in particular in opposite directions. The signals of the traps are separated as a result of the different directions of propagation and may be detected at different locations. The two traps may be generated here by splitting the light of a laser or alternatively by using two lasers.

One embodiment of the invention may allow common movements of the traps through one or more elements in the common beam path. Such elements may be movable optical elements such as for example mirrors or lenses, but they may also be fixed optical elements such as for example acousto-optical deflectors or spatial light modulators. A movement of the light source would also be conceivably.

One preferred embodiment of the invention may allow independent movements of the traps by means of one or more elements in separate beam paths. Such elements may be movable optical elements such as for example mirrors or lenses, but they may also be fixed optical elements such as for example acousto-optical deflectors or spatial light modulators. If the traps are generated by means of different light sources, a movement of these light sources would also be conceivable.

One embodiment of the invention may also provide for one or more of the detectors to be movable, in order to track a movable signal. In the case of a QPD, the highest sensitivity is achieved when the signal is spread approximately evenly over the four quadrants. If the probe moves within a PFM, the signal will leave the range of highest sensitivity, in the case of a larger movement even the range of detection. If the detector is caused to track the signal, for example by means of a piezoelectric actuator, a higher sensitivity and a greater measuring range may be achieved.

A further embodiment of the invention may also provide for the tracking of the position signal not to be carried out by moving the detector, but by means of elements in the beam path. Such elements may for example be movable mirrors or lenses or acousto-optical deflectors or spatial light modulators.

DESCRIPTION OF THE EMBODIMENTS OF THE INVENTION

The invention will be explained below by means of preferred embodiments in connection with the attached figures, wherein.

Figure 1:
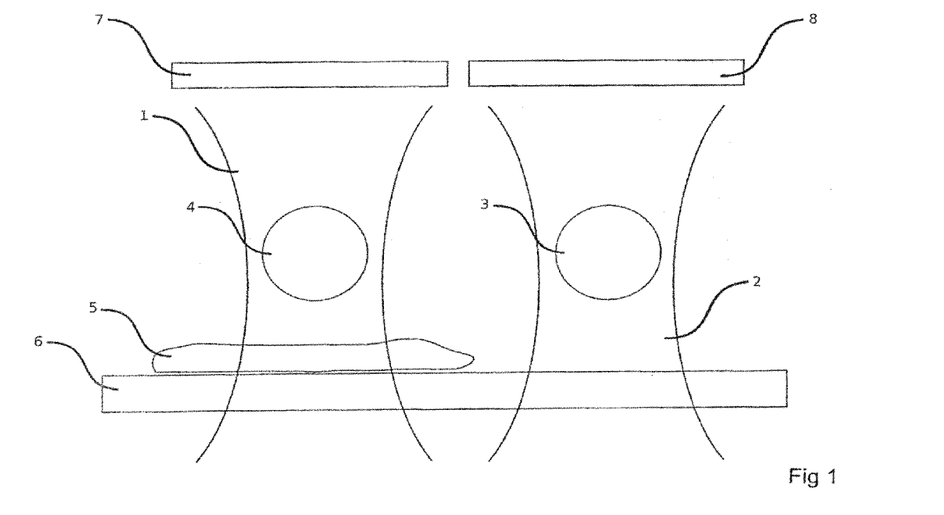
FIG. 1 shows a simplified illustration of two optical traps including a possible interference on the optical path.

FIG. 1 shows a schematic diagram of the two optical traps 1 and 2 which are located at a fixed spatial distance from each other. The probe 4 in trap 1 and the probe 3 in trap 2, both as shown, do not necessarily have to be present at the same time and are only illustrated both to show the optical traps more clearly. An interference 5 is present in the optical path of trap 1, which may be for example fixed to the cover glass 6. However, the interference 5 may also be freely movable. The interference 5 leads to a change in the position signal of the probe 4 on the detector 7, whilst the position signal for probe 3 on the detector 8 does not experience any change. The interference 5 may be identified and deducted from the position signal for probe 4 by means of a scan at the position of trap 1 first with a probe and then without a probe, which may be realised by moving the trap 1 filled with the probe 4 away, followed by a tracking movement of the empty trap 2.

Figure 2:
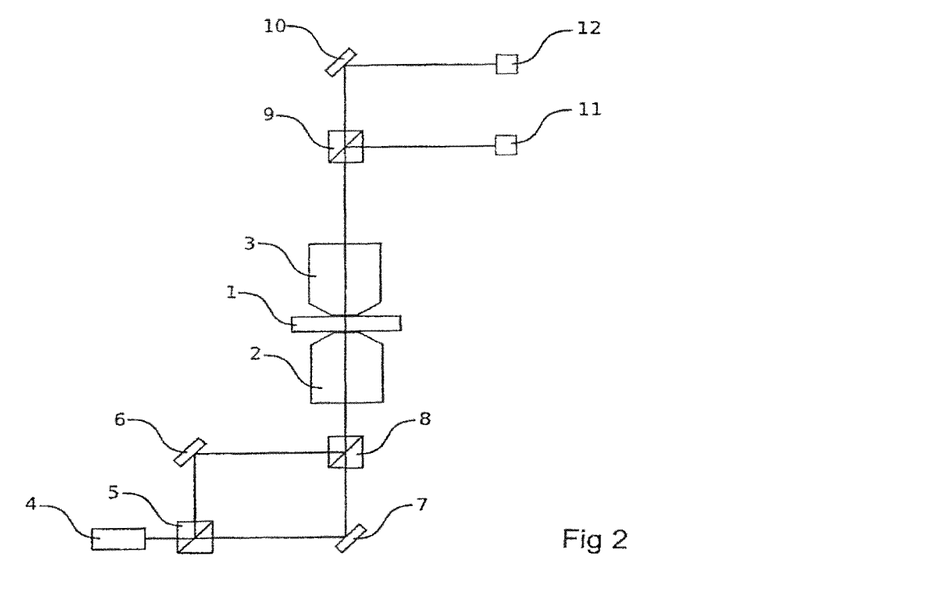
FIG. 2 shows a schematic diagram of the generation of two traps which distinguish themselves in the polarisation of the light and the separation of the signals of the two traps.

FIG. 2 shows the possible provision of two traps which are polarised vertically relative to one another. The light of the laser 4 is split into two part beams polarised vertically relative to each other in the polarising beam splitter cube 5. By means of the two mirrors 6 and 7, the beams are diverted and are reunited in the polarising beam splitter cube 8. For the sake of clarity, any possibilities for a dependent or an independent movement of the traps are not shown here. The lens 2 focuses the light within the sample chamber 1 and generates the optical traps. From the condenser 3, the light is collimated again and is separated by the polarising beam splitter 9 according to the polarisation directions. The light is then detected directly by the detector 11 or after the deflecting reflector 10 by the detector 12.

Figure 3:
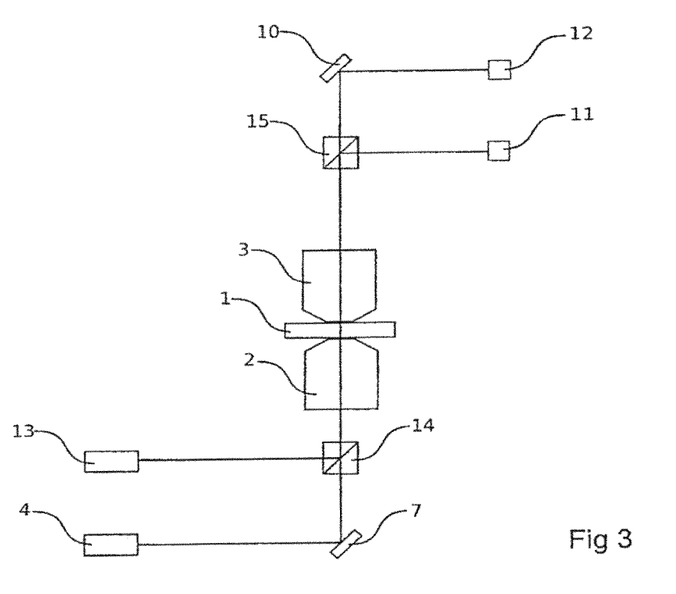
FIG. 3 shows a schematic diagram of the generation of two traps which distinguish themselves in the wavelength of the light and the separation of the signals of the two traps.

FIG. 3 shows a schematic diagram of a setup which allows the simultaneous generation of two traps by means of light of different wavelengths. The detection of the position from probes in the traps is achieved by means of a separation according to wavelength. The two lasers 4 and 13 generate light of the frequencies v1 and v2. The light from laser 4 is directed via the mirror 7 to the lens 2, the light from the laser 13 is directed via the dichroic beam splitter 14. The lens 2 focuses the light within the sample chamber 1 and generates the optical traps. From the condenser 3, the light is collimated again and is separated according to wavelengths by the dichroic beam splitter 15. If the beam splitter 15 reflects light of frequency 1, this light will be detected by the detector 11. The light of frequency v2, which is transmitted by the beam splitter 15, is diverted via the mirror 10 to the detector 12 and is detected there.

Figure 4:
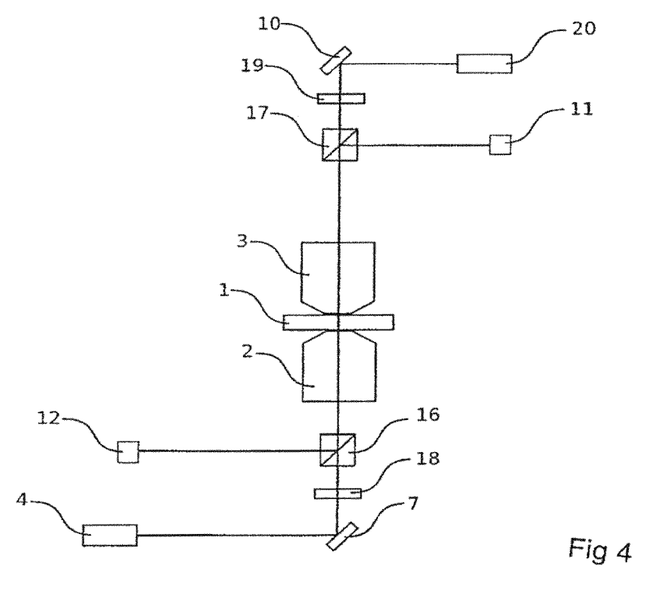
FIG. 4 shows a schematic diagram of the generation of two traps which distinguish themselves at least in their direction of propagation and the spatially separated detection of the two signals.

FIG. 4 shows the setup for realising two traps which are generated by light propagating in opposite directions. The light of laser 4 is direct by the mirror 7 to the lens 2 and is focused there into the sample chamber. The light of the laser 4 is then collimated by the condenser 3 and is diverted by the beam splitter 17 onto the detector 11. By means of the optional optical isolator 19, any light of the laser 4, which is transmitted by the beam splitter 17, may be blocked. In the opposite direction, light of the laser 20 is directed by the mirror 10 in the direction of the condenser 3 which focuses the light in the sample chamber 1 onto an optical trap. The lens 2 collimates the light again and is then directed by the beam splitter 16 to the detector 12. The optical isolator 18, which is also optionally provided, blocks the light of the laser 20, which is transmitted by the beam splitter 16. In this embodiment, the lens 2 for the light of the laser 4 acts at the same time as a condenser for the light of the laser 20, and the condenser 3 for the light of the laser 4 acts at the same time as a lens for the light of the laser 20.

Figure 5A:
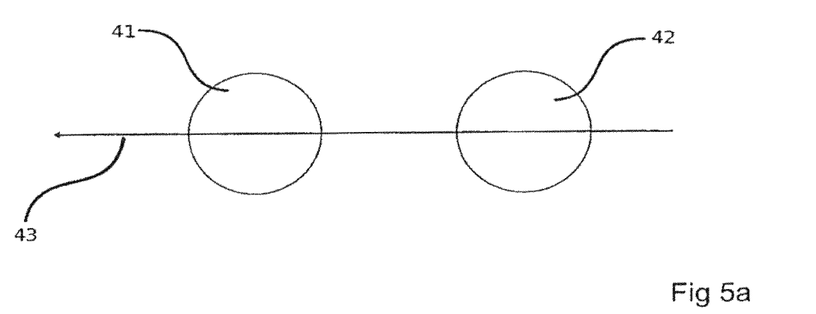
FIGS. 5a and b show a schematic diagram for possible coupled movements of two traps.

FIG. 5a shows one possible trajectory 32, along which the two probes 41 and 42 are moved. The trajectory is shown here as a straight line in order to simplify the illustration, but it may follow any desired path in three dimensions. The order in which the two probes are moved along the trajectory may here be a function of the respective embodiment.

Figure 5B:
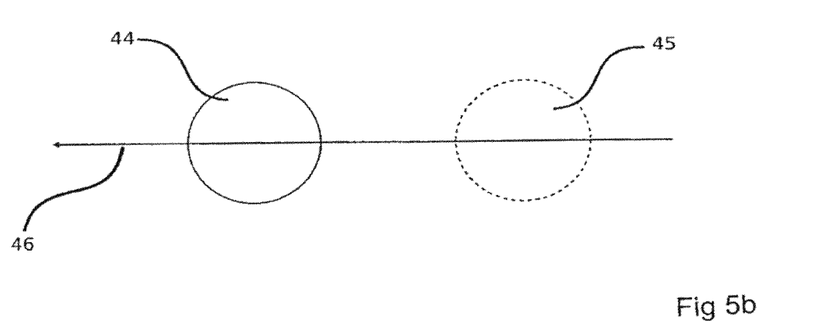
Figure 6:
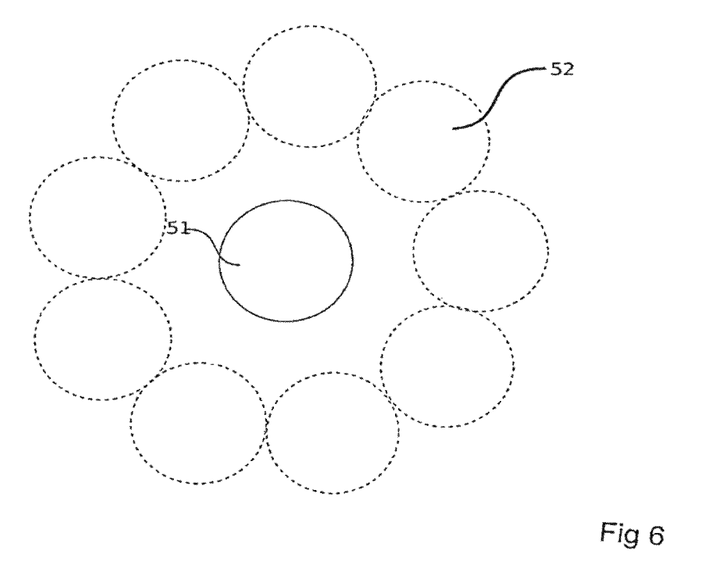
FIG. 6 shows a schematic diagram for possible coupled movements of two or more traps.

FIG. 5b shows the possibility that a trap 44 filled with a probe and an empty trap 45 move along the trajectory 44, whilst in FIG. 5b as well in FIG. 6, the filled trap is shown by the position of its probe and the empty trap(s) is/are shown by the empty location(s) where a probe may be captured. The trajectory is shown here as a straight line in order to simplify the illustration, but it may follow any desired path in three dimensions. The order in which the two traps may be moved along the trajectory, may be determined here by way of experimentation.

FIG. 6 shows a schematic diagram illustrating what happens if one or more empty traps 52 form a spherical shell around the trap 51 filled with a probe. In order to simplify the illustration, a two-dimensional cross section through the spherical shell is shown here. If the trap 51 moves, the centre of the spherical shell may be shifted for example in the direction of this movement. The spherical shell may be formed either by the simultaneous presence of several traps or alternatively by means of rapid changes of the position of a trap.

The features of the invention as disclosed in the above description, in the claims and in the figures may be of importance both individually and in any desired combination for the realisation of the invention in its various embodiments.

The invention claimed is:

1. A method for examining a sample using scanning probe microscopy, it particular by means of scanning probe photon microscopy, comprising the following steps:
    generating at least two optical traps by means of focused light with two focusing volumes which are movable within the local area of the sample, with a probe being disposed in at least one of the two focusing volumes,
    scanning the sample using the two optical traps by moving both focusing volumes relative to the sample,
    obtaining measurement data which are associated with the first optical trap containing the probe, during the scanning operation,
    obtaining measurement data which are associated with the second optical trap, during the scanning operation,
    evaluating the measurement data by correlating the measurement data of the first and the second optical traps.

2. The method as claimed in claim 1, wherein the evaluation of the measurement data by correlating the measurement data from the first optical trap, which are respectively obtained at a first point in time of the scan, with the measurement data of the second optical trap, which were obtained respectively at a second point in time, at which the focusing volume of the second optical trap was located at or immediately adjacent to the same location of the focusing volume of the first optical trap at the first point in time.

3. The method as claimed in claim 1, wherein the second optical trap likewise contains a probe, in particular the same as or a different probe to the first optical trap.

4. The method as claimed in claim 1, wherein the second optical trap does not contain a probe.

5. The method as claimed in claim 1, wherein the focusing volumes of the at least two optical traps have identical dimensions.

6. The method as claimed in claim 1, wherein the movements of the optical traps occur one after another on a common trajectory, in particular at a constant distance.

7. The method as claimed in claim 1, wherein during the scanning operation, one of the two traps is moved around the other trap, in particular in the form of a completely or partially closed spherical shell.

8. The method as claimed in claim 1, wherein the generation of the two optical traps is carried out by means of two light beams, each of which defines one of the focusing volumes.

9. The method as claimed in claim 1, wherein the generation of the two traps is carried out by means of a light beam, the position of which changes at a frequency which allows one probe each to be captured in two locally separate focusing volumes.

10. The method as claimed in claim 1, wherein the correlation of the measurement signals includes the formation of a differential measurement signal from the measurement signals of the first optical trap and the second optical trap.

11. The method as claimed in claim 1, wherein the generation of the first and second optical traps is carried out by means of light having different polarizations, in particular by means of light having an orthogonal polarizations.

12. The method as claimed in claim 1, wherein the generation of the first and second optical traps is carried out by means of light of different wavelengths.

13. The method as claimed in claim 1, wherein the generation of the first and second optical traps is carried out by means of light of different directions of propagation, in particular by means of light of opposite directions of propagation.

14. The method as claimed in claim 1, wherein the generation of the optical traps is carried out by means of light from different lasers.

15. The method as claimed in claim 1, wherein the generation of the two optical traps is carried out by means of light of a laser, the light of which is split by a beam splitter.

16. An apparatus for examining a probe using scanning probe microscopy, in particular by means of a method as claimed in claim 1, comprising the following:
    optical means for generating two optical traps by means of focused light, wherein the optical means and/or a sample holder allow a local movement of the focusing volumes relative to a sample;
    at least one probe which is disposed in one of the two optical traps,
    control means for controlling the movements of the two focusing volumes for scanning the sample,
    first detection means adapted for obtaining measurement data which are associated with the first optical trap containing the probe,
    second detection means for obtaining measurement data which are associated with the second optical trap, and
    evaluation means which receive the measurement data of the first detection means and the measurement data of the second detection means and correlate the measurement data.

* * * * *

UNITED STATES PATENT AND TRADEMARK OFFICE
CERTIFICATE OF CORRECTION

PATENT NO. : 8,415,613 B2
APPLICATION NO. : 12/602151
DATED : April 9, 2013
INVENTOR(S) : Sven-Peter Heyn et al.

It is certified that error appears in the above-identified patent and that said Letters Patent is hereby corrected as shown below:

On the title page, at column 2, item [56], under OTHER PUBLICATIONS, after "1997" insert -- ) --

In the Specification:

At column 1, line 12, after "10 2007 025534.0" delete "tiled" insert -- filed --

In the Claims:

At column 7, line 28, after "microscopy" delete "it" insert -- in --

At column 8, line 24, after "having" delete "an"

Signed and Sealed this
Fourth Day of June, 2013

Teresa Stanek Rea
*Acting Director of the United States Patent and Trademark Office*